US012625959B2

(12) United States Patent
Wright et al.

(10) Patent No.: US 12,625,959 B2
(45) Date of Patent: May 12, 2026

(54) INSTRUCTIONS TO PROCESS FILES IN VIRTUAL MACHINES

(71) Applicant: Hewlett-Packard Development Company, L.P., Spring, TX (US)

(72) Inventors: James Edwin Garnett Wright, Cambridge (GB); Ratnesh Kumar Pandey, Cambridge (GB); David Jonathan Mansergh, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 285 days.

(21) Appl. No.: 18/547,398

(22) PCT Filed: Mar. 11, 2021

(86) PCT No.: PCT/US2021/021822

§ 371 (c)(1),
(2) Date: Aug. 22, 2023

(87) PCT Pub. No.: WO2022/191843

PCT Pub. Date: Sep. 15, 2022

(65) Prior Publication Data

US 2024/0126882 A1       Apr. 18, 2024

(51) Int. Cl.
*G06F 21/56* (2013.01)
*G06F 9/455* (2018.01)

(52) U.S. Cl.
CPC ........ *G06F 21/566* (2013.01); *G06F 9/45558* (2013.01); *G06F 21/568* (2013.01); *G06F 2009/45587* (2013.01); *G06F 2221/034* (2013.01)

(58) Field of Classification Search
CPC .. G06F 21/566; G06F 9/45558; G06F 21/568; G06F 2009/45587; G06F 2221/034
See application file for complete search history.

(56) References Cited

U.S. PATENT DOCUMENTS

| | | |
|---|---|---|
| 8,621,610 B2 | 12/2013 | Oberheide et al. |
| 8,667,594 B1 | 3/2014 | Banga et al. |
| 8,719,933 B1 | 5/2014 | Khajuria et al. |
| 8,739,287 B1 | 5/2014 | Polyakov et al. |
| 8,752,047 B2 | 6/2014 | Banga et al. |
| 8,839,245 B1 | 9/2014 | Khajuria et al. |
| 8,839,431 B2 | 9/2014 | Bennett |
| 9,021,476 B1 | 4/2015 | Pratt |
| 9,092,625 B1 | 7/2015 | Kashyap et al. |
| 9,104,544 B1 | 8/2015 | Uchronski et al. |
| 9,104,837 B1 | 8/2015 | Khajuria et al. |
| 9,106,690 B1 | 8/2015 | Banga et al. |
| 9,116,733 B2 | 8/2015 | Banga et al. |
| 9,128,743 B1 | 9/2015 | Bondalapati et al. |
| 9,135,038 B1 | 9/2015 | Uchronski et al. |

(Continued)

*Primary Examiner* — Frantz B Jean
(74) *Attorney, Agent, or Firm* — Quarles & Brady LLP

(57) ABSTRACT

An example storage medium includes instructions that, when executed, cause a processor of a computing device to encrypt a source file that has been identified as potentially malicious, place the encrypted file in a location accessible to a virtual machine, provide, to the virtual machine, information for decrypting the encrypted file, and cause the virtual machine to use the information to process the encrypted file.

18 Claims, 5 Drawing Sheets

(56) References Cited

U.S. PATENT DOCUMENTS

| | | | |
|---|---|---|---|
| 9,135,046 | B1 | 9/2015 | Pratt |
| 9,148,428 | B1 | 9/2015 | Banga et al. |
| 9,201,850 | B1 | 12/2015 | Buddhiraja et al. |
| 9,203,862 | B1 | 12/2015 | Kashyap et al. |
| 9,223,962 | B1 | 12/2015 | Kashyap et al. |
| 9,239,909 | B2 | 1/2016 | Tedesco et al. |
| 9,244,705 | B1 | 1/2016 | Bondalapati et al. |
| 9,245,108 | B1 | 1/2016 | Khajuria et al. |
| 9,292,328 | B2 | 3/2016 | Pratt et al. |
| 9,354,906 | B1 | 5/2016 | Uchronski et al. |
| 9,384,022 | B1 | 7/2016 | Kapoor et al. |
| 9,384,026 | B1 | 7/2016 | Banga et al. |
| 9,386,021 | B1 | 7/2016 | Pratt |
| 9,460,293 | B1 | 10/2016 | Kashyap et al. |
| 9,558,051 | B1 | 1/2017 | Taylor |
| 9,680,873 | B1 | 6/2017 | Halls et al. |
| 9,686,304 | B1 | 6/2017 | Guo et al. |
| 9,727,534 | B1 | 8/2017 | Buddhiraja et al. |
| 9,734,131 | B1 | 8/2017 | Bondalapati et al. |
| 9,767,274 | B2 | 9/2017 | Banga et al. |
| 9,785,771 | B1 | 10/2017 | Pratt |
| 9,792,131 | B1 | 10/2017 | Uchronski et al. |
| 9,846,776 | B1 | 12/2017 | Paithane et al. |
| 9,852,296 | B2 | 12/2017 | Singh et al. |
| 9,921,860 | B1 | 3/2018 | Banga et al. |
| 10,055,231 | B1 | 8/2018 | Li et al. |
| 10,095,530 | B1 | 10/2018 | Banga et al. |
| 10,095,662 | B1 | 10/2018 | Bondalapati et al. |
| 10,210,325 | B2 * | 2/2019 | Schilling ............... G06F 16/285 |
| 10,275,269 | B1 | 4/2019 | Pratt et al. |
| 10,310,696 | B1 | 6/2019 | Taylor |
| 10,311,122 | B1 | 6/2019 | Banga et al. |
| 10,430,591 | B1 | 10/2019 | Pratt et al. |
| 10,430,614 | B2 | 10/2019 | Pratt et al. |
| 10,503,534 | B1 | 12/2019 | Southgate et al. |
| 10,534,910 | B1 | 1/2020 | Kashyap |
| 10,546,118 | B1 | 1/2020 | Kapoor et al. |
| 10,599,565 | B2 | 3/2020 | Pratt et al. |
| 10,798,077 | B1 | 10/2020 | Pratt et al. |
| 10,846,396 | B1 | 11/2020 | Banga et al. |
| 11,379,577 | B2 * | 7/2022 | Patel .................... G06F 21/566 |
| 11,740,926 | B2 * | 8/2023 | Shua .................. H04L 63/1433 |
| | | | 726/23 |
| 2013/0117848 | A1 * | 5/2013 | Golshan ............. G06F 9/45558 |
| | | | 726/23 |
| 2018/0004938 | A1 | 1/2018 | Schilling et al. |
| 2018/0165449 | A1 * | 6/2018 | Wang ..................... G06F 21/53 |
| 2018/0198821 | A1 | 7/2018 | Gopalakrishna |
| 2020/0311269 | A1 * | 10/2020 | Ellam ................... G06F 21/566 |
| 2023/0221982 | A1 * | 7/2023 | Tsirkin ............... G06F 12/1491 |
| | | | 718/1 |
| 2023/0297411 | A1 * | 9/2023 | Tsirkin ................... G06F 12/10 |
| | | | 718/1 |

* cited by examiner

INSTRUCTIONS TO PROCESS FILES IN VIRTUAL MACHINES

BACKGROUND

Malicious files can damage, disrupt or gain unauthorized access to a computer system. Examples of malicious files include computer viruses, worms, Trojan horses, spyware, adware, ransomware, etc. Anti-malware software, such as anti-virus software, may detect malicious files.

BRIEF DESCRIPTION OF THE DRAWINGS

Examples are further described hereinafter with reference to the accompanying drawings, in which

FIG. 5b illustrates an example workflow for handling a potentially malicious file that may be used instead of, or in conjunction with, the workflow of FIG. 5a.

DETAILED DESCRIPTION

Figure 1:
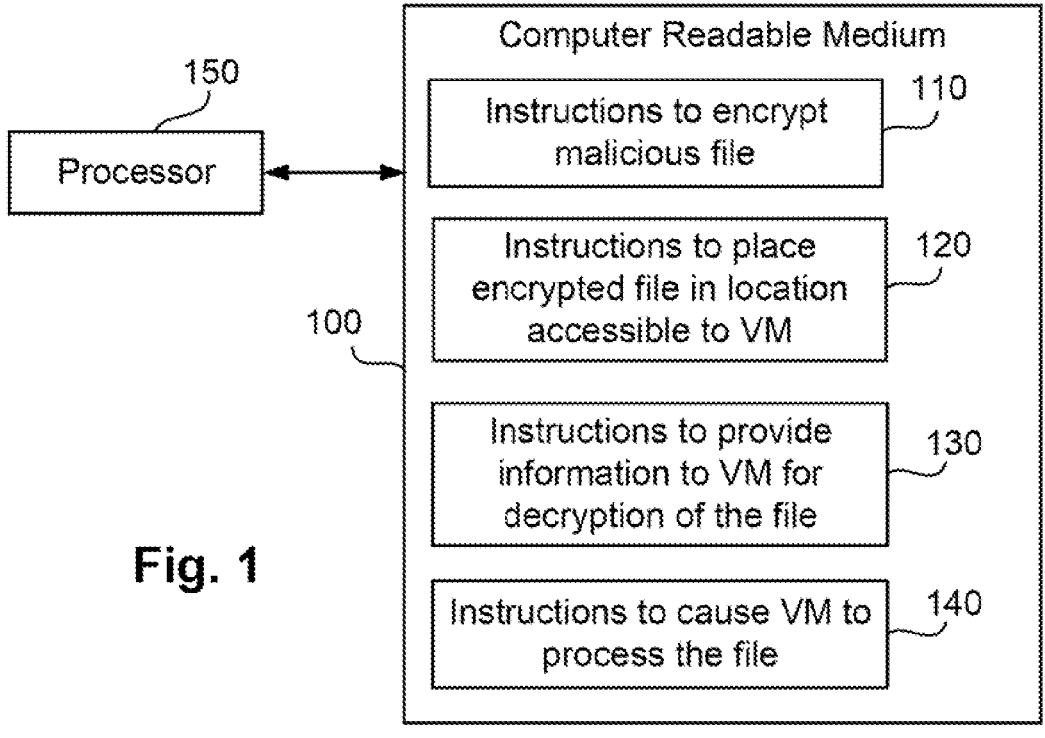
FIG. 1 is an example schematic representation of a computer-readable storage medium storing instructions to cause a processor to process a potentially malicious file.

Anti-malware or anti-virus code may detect potentially malicious files using various methods. For example, files may be checked for signatures of known malware. In other examples, potentially malicious behavior may be detected. In some examples Heuristic analysis may be used to analyze the structure, etc. of the file to assess whether the file is potentially malicious.

A malicious file will not have any negative effect on a computer system until the file is processed (e.g. control is transferred to the file). Examples of processing a file include opening, executing or interpreting the file. Executing may include, for example, executing an executable file, a dynamic-link library (DLL) file, or a plug-in. Interpreting a file may include parsing, interpreting, or rendering an image, a web page, a document file, a spreadsheet file, etc. Allowing the malicious file to remain on the computer system in a state that permits processing of the file risks such processing occurring, e.g. by a user unintentionally or unwittingly attempting to access the file, or by an automated process (such as thumbnail generation). To prevent or hinder this, the file may be quarantined.

As used herein, quarantining a file refers to placing the file in a state that prevents or hinders processing of the file, e.g. such that the file cannot be accessed directly. An example of a quarantine process includes copying an encrypted version of the file to a quarantine location and deleting the original file. The process may also include storing information about the original file in a quarantine database. The stored information may include one or more of the original location of the file, file access permissions associated with the original file, original file size, original file name, original file path, untrusted file metadata, etc. Herein, encrypting a file may refer to the use of cryptographically secure encryption or encryption that is not cryptographically secure Encryption may include symmetric or asymmetric encryption using an encryption key. Encryption may include scrambling bits of the file. In some examples of encryption, a bitwise XOR may be performed between the bits of the file and an encryption bit string. An attempt to process the encrypted file will fail, because any instructions in the original file (including malicious instructions) are obfuscated by the encryption process. Thus, the risk of unintentionally processing the file is reduced while the file is stored in an encrypted state. In some examples the encrypted file may have an unencrypted header. The header may provide information about the file, such as indicating that the file is encrypted, details of the encryption (e.g. information to assist in decrypting the file), staring location of encrypted data, etc.

A second (or subsequent) instance of a malicious file (i.e. a duplicate of a previously detected first instance of the malicious file) may be detected, where the first instance of the malicious file has been quarantined previously and remains in quarantine. The quarantine code may respond to the second instance of the malicious file by repeating the same process as was carried out for the first instance. For example, an encrypted version of the second instance malicious file may be created in a quarantine folder and the second instance malicious file may be deleted. In other examples, the quarantine code may respond to the detection of the second instance of the malicious file by recording information describing the second instance (e.g. the location of the second instance, access permissions, etc.) and associating the recorded information on the second instance with the quarantined version of the first instance of the malicious file. In this case, a single version of the quarantined file may be associated with multiple source instances of the malicious file. This may reduce the storage space used to store the quarantined files, and may reduce a processing burden in encrypting (or otherwise rendering safe) the quarantined files relative to creating a distinct encrypted version of each of the duplicate malicious files. The recording of information describing the second instance malicious file may be performed using a quarantine database.

In some examples, a quarantined file may be stored with different access permissions from the original malicious file. For example, where the quarantined file represents multiple instances of a malicious file that were detected at different locations, the various instances may have differing access permissions, which might not be suitable for representation by, for example, an Access Control List (ACL) associated with the quarantined file. A quarantine database may be used to store the access permissions associated with the original file or files. This may be used, for example, when restoring an original file from the quarantined version of the file in response to a user indication that the original file is not malicious. In some examples, a Security Descriptor Definition Language (SDDL) string for the ACL associated with the original file may be stored in the quarantine database. In some examples, a Discretionary Access Control List (DACL) associated with the original file may be stored in the quarantine database.

Other approaches may also be used in addition to, or instead of, encryption to hinder processing of the quarantined file.

In some examples, the quarantine location may be a folder or storage location with reduced visibility or accessibility to users and/or processes in the computer system.

In some examples, a determination that a file is malicious may be assessed to be erroneous, e.g. if a user believes the file is not malicious. In this case, the quarantine code may receive a user instruction to restore the original file. The original file may then be restored from the quarantined copy (e.g. by decrypting an encrypted quarantine version of the file). In some examples, the original file may be restored to its original location and/or may be restored with the file access permissions of the original file. Where information on the original file is stored in a database, the information may be used in restoring the original file.

In some examples, a request or instruction to restore a file from quarantine may be blocked or denied unless it originates from a user having elevated rights or privileges, such as an administrator of the computer system. This may reduce the risk of a non-administrator user of the computer system erroneously restoring a file from quarantine and exposing the computer system to the malware. However, responding to user requests to restore a file from quarantine may increase a burden on an administrator of the computer system and may delay a user from accessing a file which has been incorrectly identified as malicious.

In some cases, restoring a file from quarantine may automatically add the file to a whitelist, such that other copies of the file (e.g. duplicates of the file that are subsequently received or placed on the computer system) are not identified as malware. In some cases, if multiple copies of the file have been quarantined, restoring one may result in all copies being restored. This can increase the likelihood of one of the copies of the file being processed. Where the file does contain malware (e.g. where restoring the file was an error) there is an increased risk to the system.

According to some examples disclosed herein, a quarantine in place operation may be provided. In this case, in response to detection of a potentially malicious file, rather than delete or copy the file to a separate quarantine location, the file may be left in its original location (such that the quarantine location may be considered to be the original location of the file). Metadata associated with the file may be set, generated, or modified to indicate that the file has been identified as malicious. For example, a "malicious" flag associated with the file may be set. When at attempt is made to process the file, the malicious flag may be checked. In response to the check revealing that the malicious flag has been set the processing of the file may be prevented or blocked. For example, an operating system (e.g. host operating system) of the computing device may receive a request to perform an operation involving the potentially malicious file (e.g. when a user attempts to open a file by double-clicking on the file). The file may be stored on a file system that is maintained by the operating system. Operating system code running on user mode may request the access to the file, the security code may include file system filter driver code that intercepts the request targeted at the file in this example the operating system does not request the file directly from the filesystem. When the driver determines that a malicious flag associated with the file has been set, the filter may prevent or block processing of the file. On the other hand, when the driver determines that the file does not have the associated malicious flag set, the file may be provided to the operating system. In some examples the driver may be a filter driver or mini-filter driver, for example.

The metadata including the malicious flag may be stored in various locations and in various manners. For example, the metadata may be stored in a same folder of the filesystem as the file (e.g. in a file with metadata for the files in that folder, or in a file including a list that identifies files in that folder that are identified as potentially malicious the files may be identified by filenames or hashes, for example), in other examples, the metadata for all files (or a plurality of files in various locations) may be stored centrally, or in a single location, such as a database or central repository, etc.

Setting a malicious flag in the file metadata may signal to a filter driver that any read\execute access to the file should be blocked. In some examples, if a system process attempts to access the file, the filter driver may query the file metadata and check if the malicious flag is set for that file. If the malicious flag is set the access may be blocked. In some examples, the filter driver may be configured to block access when a user tries to open the malicious file by any means. In other examples, the filter driver may be configured to respond to an attempted access identified as the result of a user click by redirecting the file to open (be processed) within a VM.

Where a file that has been quarantined in place is to be removed from quarantine and restored (e.g. because it was incorrectly identified as malicious), the metadata may be updated to remove the malicious flag.

In some examples quarantine in place may be used when an alternative quarantine operation fails. For example, where copying the file to a separate quarantine location (possibly in an encrypted form) fails, or where deletion of the original file fails. This may be caused, for example, by two anti-malware solutions interfering with each other. In this case, quarantine in place allows for processing of the file to be prevented, blocked, or hindered without permanent loss of the data in the file.

In some examples, quarantine in place may allow a user to more easily locate the file. Where the quarantine location is difficult to find for a user or is not accessible to a user, the user may be confused or frustrated by the absence of the file.

A file that is quarantined in place may be represented to a user differently. For example, when graphically viewing the filesystem contents, an icon associated with a file that has been quarantined in place may be modified relative to an icon associated with an unquarantined file of the same type. This may assist a user in recognizing the status of the file as potentially malicious.

Where a user attempts to access a potentially malicious file that has been quarantined in place, information may be presented to the user, e.g. in a dialogue box, explaining that the file has been determined to be potentially malicious.

According to some examples, a virtual machine (VM) may be used to interact with a potentially malicious file on a computer system, e.g. by processing the potentially malicious file within the VM. The VM may use hardware isolation to prevent changes made in the VM from affecting the host system. Any changes in the VM may be discarded when the VM is shut down, preventing, or reducing the risk of, any malware present in the potentially malicious file affecting the host system. Examples may make use of a traditional VM or a microVM, for example. A microVM may offer lower latency and use fewer system resources than a traditional VM. A VM may be managed by a virtual machine manager (VMM), a hypervisor, or a microvisor, for example. In some examples, the VMM may be classified as Type 1 or Type 2. Type 1 refers to a VMM that executes directly upon the hardware of the system and is the most privileged software component within the system. Type 2 refers to a VMM that executes within a host operating system, and in that case the VMM may have a lower privilege than the host operating system. The type of VM used in examples herein is not particularly limited.

Some examples allow for processing of a quarantined file while limiting the risk of exposing the computer system to malware potentially included in the quarantined file. According to some examples, a potentially malicious file that has been quarantined may be processed within a virtual machine, while the file remains in a state that hinders processing of the potentially malicious file outside of the virtual machine (e.g. the state of the file hinders the host operating system from processing the potentially malicious file).

FIG. 1 shows an example schematic representation of a computer-readable storage medium 100 storing instructions. The instructions may be included in security code. The security code may be executed by the host OS or by a VMM, such as a Type 2 VMM. In some examples the instructions cause a host-side process to be performed and a VM-side process to be performed. The host-side process being a process on the host computer and the VM-side process being a process executing within the VM. In some examples a host-side process of the security code may be a protected process, e.g. using Protected Process Light (PPL).

The instructions may cause a processor 150 of a computing device to encrypt 110 a source file that has been identified as potentially malicious. In some examples the encryption of a file may be performed as part of a quarantine process, in some examples the encryption may be performed independently of a quarantine process. The encryption may be such that an attempt to process the file will fail because the encryption obfuscates contents (e.g. instructions) in the file. This may be implemented as a host-side process of the security code.

The instructions, when executed, may cause the processor to place 120 the encrypted file derived from the potentially malicious source file in a location accessible to a virtual machine.

The location accessible to the VM may be a shared location in a storage device (such as a hard drive), for example, from which the VM is able to read data. In some examples the file may be placed in the location by copying a file from a quarantine location. For example, an encrypted file in a quarantine folder may be copied to a shared folder accessible to the VM. In some examples, rather than copy a quarantined file to the shared location, a link (e.g. a hard link, a Windows reparse point, or similar object) may be created in the shared location, with the link pointing to the quarantined file in the quarantine location, in some examples the quarantined file may be copied to a temporary file and a link in the shared location may point to the temporary file. In some examples, if it is determined that creation of a link in the shared location has failed, the file that was the target of the link may be copied to the shared location. In some examples the VM may be permitted to access to the shared location but other processes in the host may be denied access the shared location. This may be implemented using a filter driver, for example, such as a file system filter driver. In some examples the path of the link or file in the shared location may be accessible to the VM but inaccessible to other processes. For example, the host may allow a process associated with the VM to access the shared location and disallow access for other processes executing on the host. This may help to avoid harm to the host system from the potentially malicious file in the VM, as data or code running within the VM is not accessible to the host and malicious behavior of the file is contained within the VM.

When creating a copy of the quarantined file, either in the shared location or as a temporary file in another location, the copy may be assigned access permissions corresponding with, or based on, access permissions of the original file (which may be different from the access permissions of the file in the quarantine location). For example, access control information of the encrypted file may be based on access control information of the original file. For example, when the file is copied from the quarantine location, the quarantine database may be checked to determine access permissions of the original file and the same access permissions may be applied to the copy. In this case, where a process in the host operating system representing the VM has the same rights as a current user of the computer system, normal access controls in the host operating system will be applied to attempts to open the file in the VM. Accordingly, access to the file will be restricted to users that would have had suitable rights for accessing the original file. This may prevent or hinder a user obtaining access to a quarantined file when they did not have suitable rights for accessing the original file. In some examples the copy of the quarantined file may have different access permissions from the source file. For example, the quarantine file may be made read-only (e.g. preventing write access), regardless of write permissions associated with the source file. This may avoid changes being made to the file. In some examples, the read access permissions of the encrypted copy for a particular user may be the same as the read access permissions of the source file for that particular user.

Where the malicious file has been quarantined in place, an encrypted version of the file may be crated in the location accessible to the VM. By using an encrypted version, the file in the location accessible to the VM is less likely to be detected as a malicious file by anti-malware code of the computing device; such detections (and any remedial action in response to the detections) may interfere with access to the file by the VM.

Placing the encrypted file in a location accessible to a virtual machine may be implemented as a host-side process of the security code. The host-side process may send a message (e.g. an inter-Process Communication (IPC) message) to a VM-side process of the security code to identify the file in the location (e.g. identifying a path and filename).

The instructions may cause the processor to provide 130 information for decrypting the encrypted file to the VM to decrypt and process the encrypted file. For example, where the file is in an encrypted state to hinder processing the file, the information may include an encryption or decryption key. The VM may obtain the original file by using the key to decrypt the encrypted version of the file, for example. Where the encrypted file is produced by a bitwise XOR operation with a bit string, the bit string may be provided to the VM, for example. Where the host-side process is a protected process the risk of the information for decrypting being obtained by a malicious processes may be reduced.

The information may be provided to the VM in various ways. For example, a file containing the information may be placed in the location accessible to the VM. In some examples the information may be provided to the VM along with instructions to process the potentially malicious file when the VM is initiated. In some examples the VM may receive a message including the information. In some examples the message may include instructions to read the file in the shared location. In some examples the message may be an IPC message from a host-side process of the security code to a VM-side process of the security code.

In some examples the information may be provided to the VM in a cryptographically secure way, for example by establishing a session key between the VM and the quarantine code (e.g. using a Key exchange mechanism) and using the session key to encrypt the information prior to providing it to the VM, which may then decrypt the received information using the session key to obtain the unencrypted information. This may improve security and reduce the risk of the encrypted version of the quarantined file being decrypted outside of the virtual machine.

The VM may process 140 the file using the information. For example, the VM may produce a decrypted version of the file in memory using the information to decrypt the encrypted file, and may then process the decrypted version of the file stored in the memory. The memory used by the VM may be isolated from other processes in the computer system, e.g. using hardware isolation. This may reduce the risk of the potentially malicious file being processed outside of the VM. Processing the file may include opening the file with an appropriate application (e.g. an application associated with the file type of the source file).

In some examples when the file is processed in the VM some operations may be blocked. For example the blocked operations may include one of more of: copy/paste, save & send, printing, autosave, PDF digital signing, etc. This may reduce the risk of the potentially malicious file affecting the host system or other systems outside the VM.

In some examples, the VM may be shut down when it is no longer being used. For example, when the user has fished viewing the contents of the file. On shutdown, the VM may be discarded, such that it is no longer present on the computing device (e.g. by deleting the files associated with the VM). Further, memory used by the VM, including memory storing the decrypted version of the malicious file, may be overwritten with arbitrary data (e.g. zero's). This may reduce the risk of the malicious file being processed outside of the VM.

In some examples, the instructions may cause the processor to quarantine a source file that has been identified as being potentially malicious. The instructions may allow the file to be unquarantined (e.g. to restore the source file) in response to an instruction or request (e.g. from a user). In some examples, the file will not be unquarantined in response to an instruction or request if the instruction or request does not have a privilege suitable to unquarantine files. In some examples, the computing device may be configured such that the privilege to unquarantine files is reserved to administrators, such that normal users are not permitted to unquarantine files. Quarantining and/or unquarantining the file may be implemented as a host-side process.

In some examples a request to unquarantine a file may be received and, in response, a privilege associated with the request may be determined. If it is determined that the request has an administrator privilege (e.g. based on a user that issued the request having a privilege appropriate for unquarantining flies) the file may be unquarantined (e.g. the original file may be restored), if it is determined that the request does not have an administrator privilege (e.g. based on the request being issued by a user that does not have a privilege appropriate for unquarantining files) the request may be refused or denied and the file may remain in quarantine.

The instructions may include instructions to carry out, in response to a user request, the operations of (i) placing the file in a location accessible to the VM, (ii) providing to the VM the information for decrypting, and (iii) processing the file in the VM. In some examples, the instructions may carry out (i) to (iii) independently of whether the request has the administrator privilege appropriate to unquarantine the file (e.g. where the user does not have the administrator privilege appropriate to unquarantine the file). Accordingly, in some examples a right or privilege to unquarantine a file may be different and distinct from a right or privilege to process the file in a VM, in some examples, unquarantining a file may be associated with higher rights or privileges (e.g. administrator rights) than processing the file in a VM (which may be permitted with normal user rights in some examples). In some examples, administrator rights may also include the right to process the file in a VM.

The instructions may cause the processor to quarantine the source file in place, by setting a flag in metadata associated with the source file to indicate that the source file is potentially malicious. The flag may cause a filter driver to block an attempt to process the source file. The file placed in the location accessible to the VM may be an encrypted copy of the source file. By encrypting the source file, the copy of the file accessible to the VM may be less likely to be detected as malicious, reducing the risk of anti-malware code detecting the copy as a malicious file and interfering with access to the file by the VM (e.g. by quarantining or deleting the copy).

In some examples the instructions may cause the processor to quarantine the source file in place in response to a determination that a first quarantine operation has failed. For example, where the first quarantine operation includes making an encrypted copy of the of the source file in a quarantine location and deleting the source file. For example, the creation of the encrypted copy in the quarantine location may fail, or the deletion of the source file may fail. By encrypting the file in place it may be possible to prevent accidentally processing the potentially malicious source file.

Quarantine in place may be implanted as a host-side process of the security code.

Figure 2:
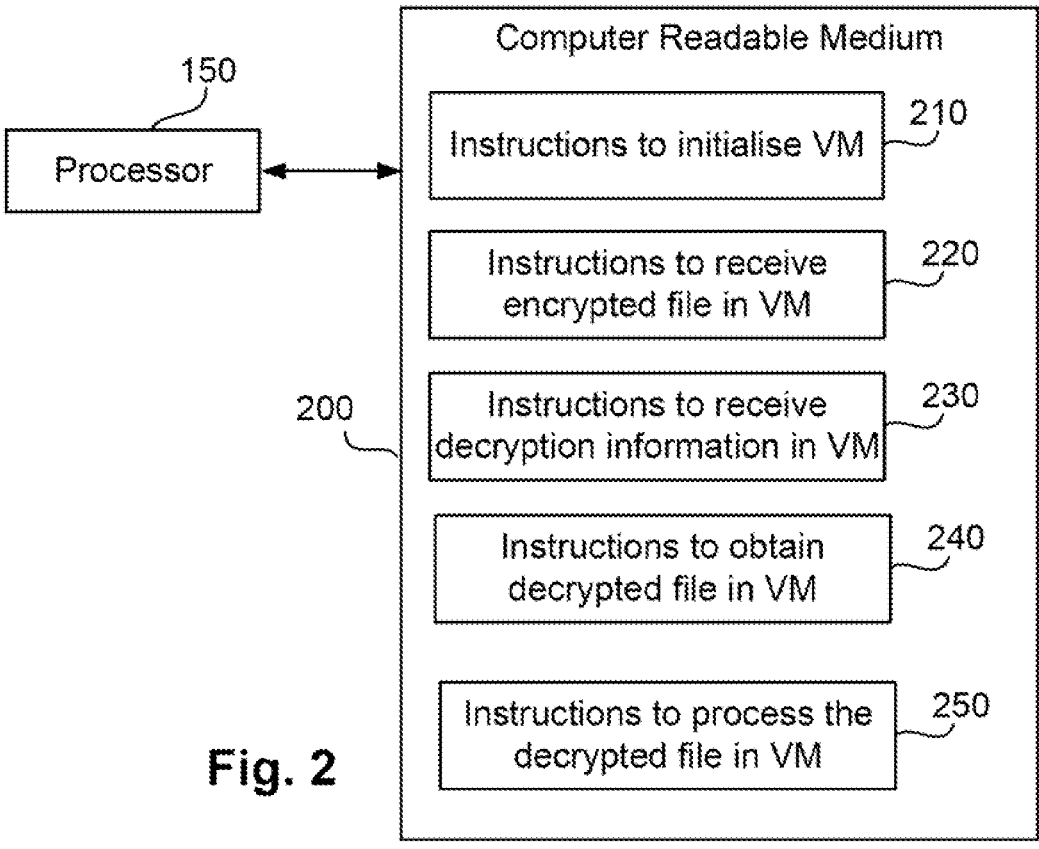
FIG. 2 is an example schematic representation of another computer-readable storage medium storing instructions to cause a processor to decrypt and process an encrypted version of a potentially malicious file.

FIG. 2 shows an example schematic representation of a computer-readable storage medium 200 storing instructions to cause a processor 150 to initialize 210 a VM. For example, a VMM may assign resources to the VM and create an image file. The VM may be tailored to its intended purpose. For example, if the VM is to open an image file it may be created with code suitable for decoding the image file.

The instructions may cause the VM to receive 220 an encrypted file. The encrypted file may be an encrypted version of a potentially malicious file, such as a file that has been quarantined. Where the file is a file that has been quarantined by encrypting the original file, the encrypted file received by the VM may correspond with the quarantined version of the file (e.g. by copying the encrypted quarantine file to a shared location accessible by the VM).

In some examples the file may be placed in the shared location prior to initialization of the VM. For example, when the file has been placed in the shared location, a host manager may notify a VMM to assign a micro VM for the document.

The instructions may cause the VM to receive 230 decryption information to decrypt the encrypted file. The decryption information may be a decryption key, for example.

The instructions may cause the VM to obtain 240 a decrypted version of the encrypted file by using the decryption information. For example, where the decryption information is a decryption key, using the decryption key to decrypt the encrypted file. The decrypted version of the file may be written in memory that has been assigned to the VM.

The instructions may cause the VM to process 250 the decrypted file. For example, the file may be executed, interpreted, etc., in the VM.

In some examples, in response to an indication that the file has been detected as potentially malicious, the instructions may cause metadata to be set. The metadata may indicate to a filter driver that the file is potentially malicious, and may cause the filter driver to block processing of the file.

In some examples the filter driver may be a mini-filter driver. In some examples, when an attempt is made to read or execute a file the filter driver may check whether the metadata indicating a malicious file has been set or associated with the file. Where metadata indicating that the file is malicious has been set, the filter driver may determine if the process attempting to read or execute the file is a system process. If a system process is attempting to read/execute the file, the read/execution may be blocked by the filter driver. In some examples the filter driver may determine whether the process associated with the read/execute is a user-initiated process (e.g. where a user has double-clicked on the file). If the process is user-initiated, the filter driver may direct the file to be opened in a VM. In some examples the filter driver may allow read/execution of the file by a process if the process has an exception allowing it to access the file. For example, such an exception may be granted to a host-side process associated with a VM assigned to process the file. A user-initiated process may be a process that is initiated by input via a user interface device, such as a keyboard, mouse or touch screen.

In some examples the metadata indicating the file as potentially malicious may be assigned in response to a determination that a quarantine operation of the file has failed. The failed quarantine operation may include creating an encrypted version of the file in a quarantine location and deleting the file.

The instructions may set an access control list of the encrypted version of the file. The access control list may be based on an access control list of the original file. For example, the access control list of the encrypted file may be the same as the access control list of the original file. In some examples the access control list of the encrypted file may be arranged to disallow write access to the encrypted version of the file, such that editing of the file is not permitted.

In some examples the file may be quarantined by creating a first encrypted version of the file and deleting the original file. In some examples the encrypted version of the file may be received in the VM by copying the first encrypted version of the file to create a temporary file (i.e. a second encrypted version of the file). A link to the temporary file may be created in a location accessible to the VM. The link may be, for example, a hard link, a Windows reparse point, or similar object.

Figure 3:
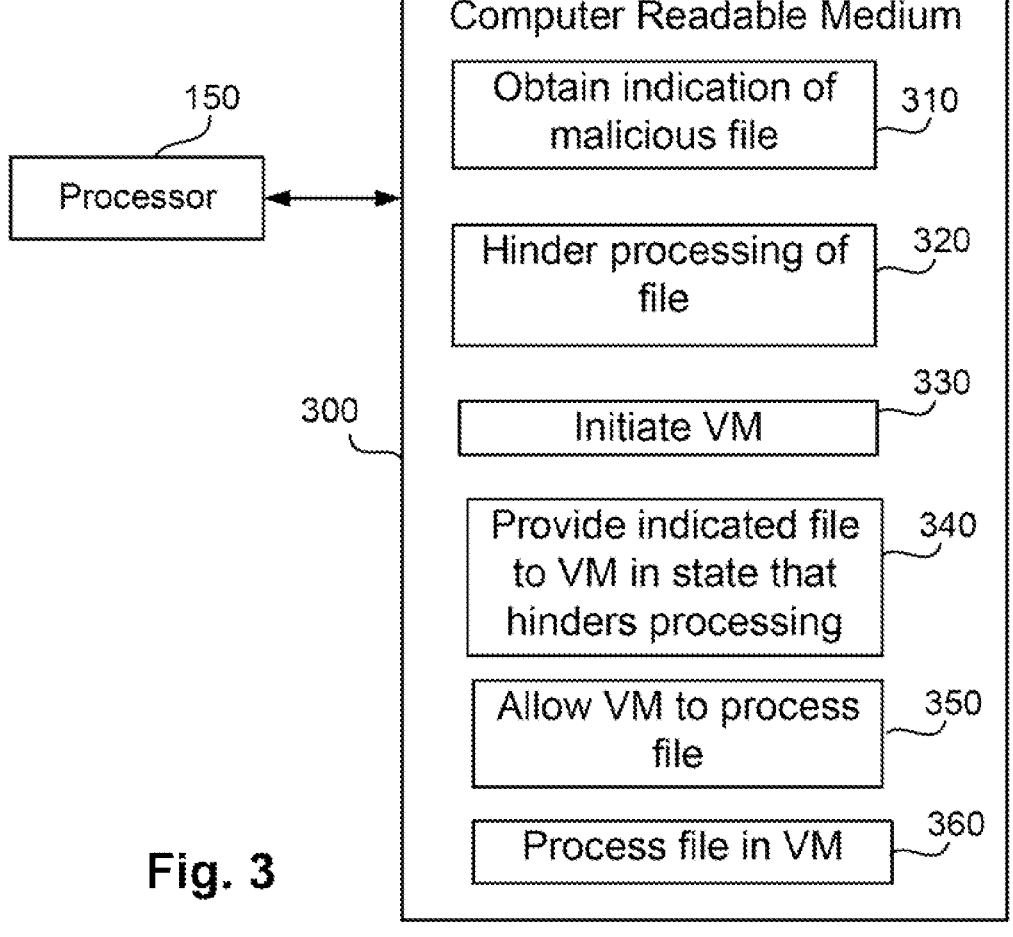
FIG. 3 is an example schematic representation of a computer-readable storage medium storing instructions to cause a processor to process a potentially malicious file that is provided to the VM in a state that hinders processing.

FIG. 3 shows an example schematic representation of a computer-readable storage medium 300 storing instructions to cause a processor 150 of a computing device to obtain 310 an indication that a file has been determined to be malicious. For example, an anti-malware program may scan the file, determine that the file includes malware and indicate that the file is malicious. The determination that a file is malicious may be based on the contents (e.g. a signature) or behavior of the file, for example. The indication of a file as malicious may be distinct from and/or independent of a determination that a file is untrusted (e.g. where a file is determined to be untrusted because of the origin of the file). In some examples a user may request that an untrusted flag associated with a file be removed, such that the file becomes trusted. This request may be denied if the user does not have elevated privilege (e.g. where the request is not issued by an administrator of the system). In some examples a privilege that permits removal of an untrusted flag may be higher than a privilege that permits processing of the file in a VM.

The instructions may cause the processor to hinder 320 processing of the file in response to the obtained indication. Processing may be hindered by encrypting the file or b associating metadata with the file to indicate that the file is malicious, for example.

The instructions may initiate no a VM, e.g. in order to allow a user to process, view, or interact with the contents of the file. In some examples, the VM may be initiated in response to a user request to process the file.

The instructions may provide 340 the file to the VM in a state that hinders processing of the file by a host operating system. The file may be provided to the VM by placing the file in a shared location (e.g. by copying the file to the shared location or creating a link in the shared location that points to the file).

The instructions may allow 350 the VM to process the file. For example, where the file is encrypted, a decryption key may be provided to the VM. Or, for example, where metadata is set to indicate that the file is malicious, a filter driver may be configured to allow a process associated with the VM to process the file.

The instructions may cause the virtual machine to process 360 the file. For example, this may allow a user to view or interact with the contents of the file.

In some examples a metadata flag may be set to indicate that the file has been determined to be malicious. For example, where the file is quarantined in place.

In some examples, when a process attempts to process a file, the instructions may cause the processor to check the metadata flag and block the processing of the file by the process if the metadata flag indicates that the file has been determined to be malicious. In some examples the instructions may permit the processing of a file that has been flagged as malicious if an exception has been granted to the process.

In some examples, allowing the VM to process a file that is indicated as being malicious may include granting an exception to a process associated with the VM to allow the VM to process the malicious file.

In some examples the instructions may cause the file to be provided to the VM by generating an encrypted copy of the file in a location accessible to the VM. The location may be a shared location. The encrypted copy may be generated by copying an encrypted file to the location or by placing a link that points to an encrypted file in the location. The encrypted file may be generated during a quarantine process. In some examples the encryption may be performed as part of the process of providing the file to the VM. Encrypting the file may reduce the risk of the file being processed outside of the VM and/or reduce the likelihood of the encrypted file being detected as malware by anti-malware code that could interfere with the process of providing the file to the VM and/or opening the file in the VM.

In some examples the instructions may cause the processor to determine whether an attempt to process the malicious file is user-initiated. For example, where the attempt to process the file is a direct result of a user action, such as an input by a user (e.g. double-clicking on a file to open it, or selecting an option in a quarantine application to view the file securely.)

If the attempt is determined to be user initiated the operations to initiate a VM and provide the file to the VM, etc. may be carried cut in order to allow the user to view and/or interact with the contents of the file. In some examples, if it is determined that the attempt to process the file is not user-initiated (e.g. the attempt is due to a system process) the operations to initiate a VM and provide the file the VM, etc. may be blocked or suppressed. In some cases, a user may be more likely than a system process to benefit from viewing a potentially malicious file.

In some examples the instructions may quarantine a file identified as malicious by creating a quarantine file and deleting the identified file. The quarantine file may be an encrypted copy of the identified file. Providing the file to the VM may include placing a copy of the quarantine file in a location accessible to the VM. The location may be a shared location. Placing a copy of the file may include copying the file to the location or creating a link in the location, where the link points to the quarantine file or a copy of the quarantine file, for example.

The instructions to allow the VM to process the file may cause the processor to provide the VM with information usable to decrypt the quarantine file, e.g. a decryption key.

Figure 4:
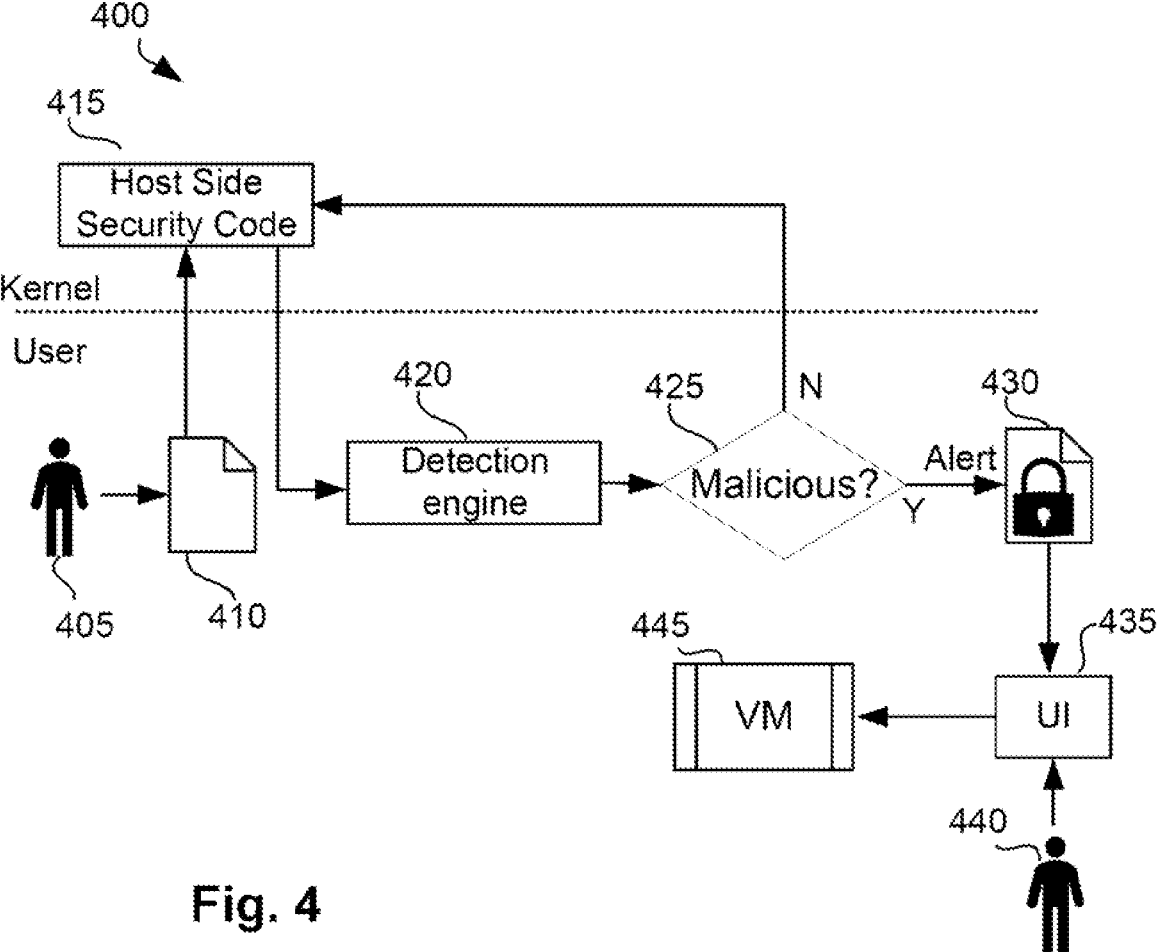
FIG. 4 illustrates an example workflow for handling a potentially malicious file.

FIG. 4 illustrates an example workflow 400 according to some examples. An actor 405 (e.g. a user) may attempt to place a file 410 on the computer system (e.g. by copying, downloading, etc.) A host-side security process 415 associated with the security code (e.g. implemented in a kernel filter driver) may intercept the file operation and cause the file 410 to be checked to determine whether the file 410 is malicious. The check may be performed by a detection engine 420, such as anti-malware or antivirus code. Where the file 410 is not determined to be malicious (e.g. the file is determined to be safe), the host side security code 415 may be informed of the determination and may allow access to the file 410 as normal (e.g. the file is not blocked by a filter driver).

Where the file 410 is determined to be malicious by the detection engine 420 the file may be quarantined. For example, the file may be quarantined by creating an encrypted version of the file 430 in a quarantine location and the original file 410 may be deleted. In some examples the determination that the file 410 is malicious may also prompt an alert to be issued to a user informing them of the detection of the file 410 as malicious.

An actor 440 (e.g. a user) may interact with a user interface (UI) 435 in order to request secure processing of the file in a VM. In some examples the UI 435 is a graphical or text-based UI element associated with the host-side security code. In some examples the UI 435 may be an interface element associated with the alert that allows the actor 440 to request secure processing from the alert dialogue, for example. Actor 405 and actor 440 may be the same or different actors.

The file may be processed (e.g. opened, viewed, executed, etc.) in a VM 445, as described in relation to FIGS. 1 to 3. In some examples, in response to the actor 440 requesting secure processing it may be determined whether secure processing should be allowed, and if it is determined that secure processing should not be allowed, secure processing may be blocked such that the file is not processed in VM 445. For example, it may be determined that secure processing should not be allowed if actor 440 does not have relevant permissions suitable far processing the original file 410. In some examples, it may be determined that secure processing should not be allowed if the file is not suitable for processing in a VM (e.g. the file is of a type that cannot be processed by an available VM).

In some examples, when the file is processed in the VM 445, an appearance of a user interface may be changed to alert or remind a user that the file has been determined to be malicious and has been opened securely. For example, this may remind the user that some operations or functionality may be disabled (such as saving, printing, etc.) In some examples the interface may be changed by displaying the contents of the file with a border or banner (e.g. a red border or banner).

Figure 5A:
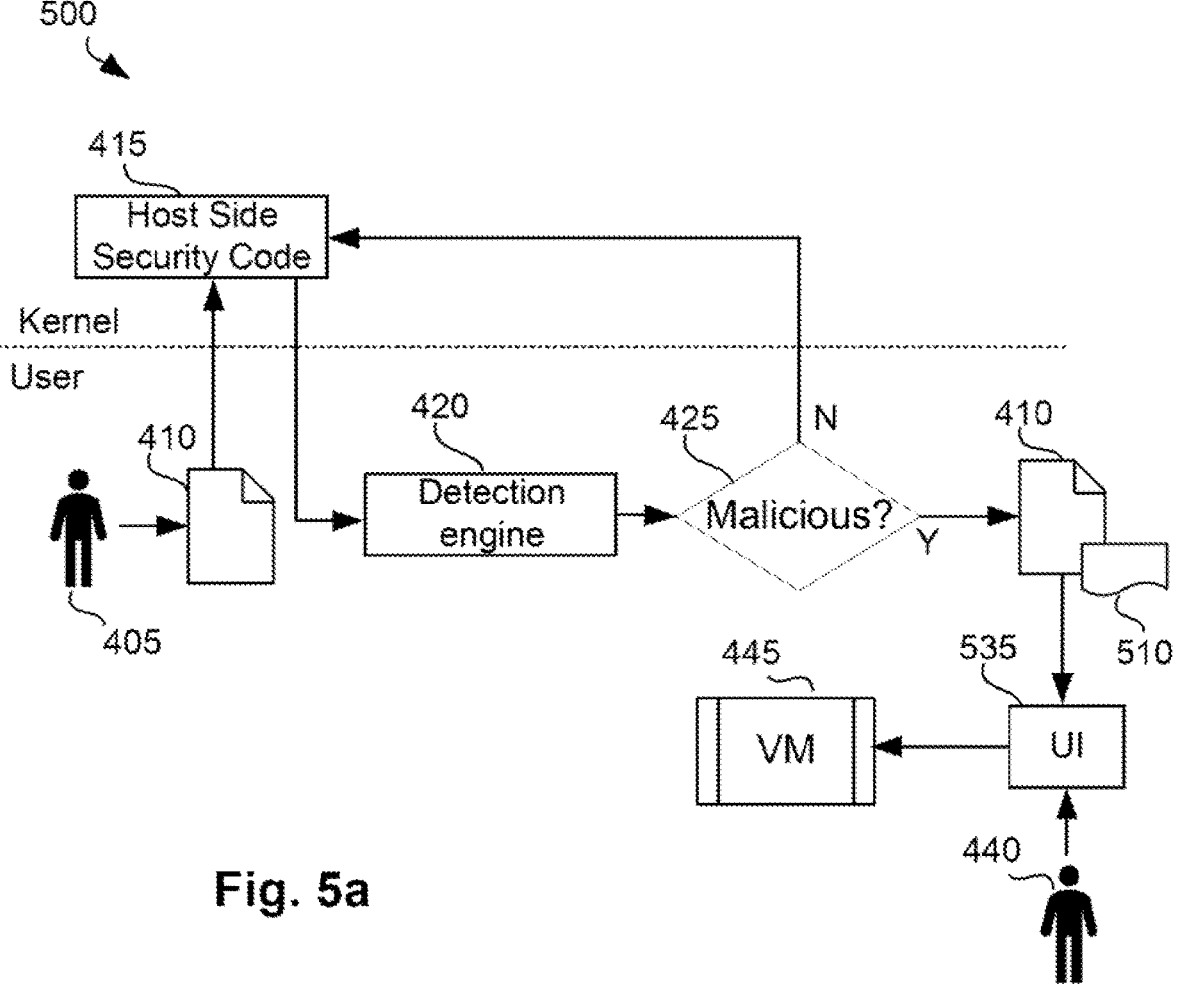
FIG. 5a illustrates another example workflow for handling a potentially malicious file.

FIG. 5a illustrates an example workflow 500 according to some examples. An actor 405 (e.g., a user) may attempt to place a file 410 on the computer system (e.g. by copying, downloading, etc.) A host-side security process 415 associated with the security code (e.g. implemented in a kernel filter driver) may intercept the file operation and cause the file 410 to be checked to determine whether the file 410 is malicious. The check may be performed by a detection engine 420, such as anti-malware or antivirus code. Where the file 410 is not determined to be malicious (e.g. the file is determined to be safe), the host side security code 415 may be informed of the determination and may allow access to the file 410 as normal (e.g. the file is not blocked by a filter driver).

Where the file 410 is determined to be malicious by the detection engine 420 the file may be quarantined in place. For example, metadata 510 may be set or associated with the file 410 to indicate that the file has been detected as potentially malicious. In some examples the determination that the file 410 is malicious may also prompt an alert to be issued to a user informing them of the detection of the file 410 as malicious.

An actor 440 (e.g. a user) may interact with a user interface (UI) 535 in order to request processing of the file. In some examples the UI 535 is a graphical or text-based UI element associated with the host-side security code. In some examples the UI 535 may be an interface element associated with the alert that allows the actor 440 to request secure processing from the alert dialogue, for example. Actor 405 and actor 440 may be the same or different actors.

The file may be processed (e.g. opened, viewed, executed, etc.) in a VM 445, as described in relation to FIGS. 1 to 3. In some examples, in response to the actor 440 requesting secure processing it may be determined whether secure processing should be allowed, and if it is determined that secure processing should not be allowed, secure processing may be blocked such that the file is not processed in VM 445. For example, it may be determined that secure processing should not be allowed if actor 440 does not have relevant permissions suitable for processing the original file 410. In some examples, it may be determined that secure processing should not be allowed if the file is not suitable for processing in a VM (e.g. the file is of a type that cannot be processed by an available VM).

In some examples, when the file is processed in the VM 445, an appearance of a user interface may be changed to alert or remind a user that the file has been determined to be malicious and has been opened securely. For example, this may remind the user that some operations or functionality may be disabled (such as saving, printing, etc.) In some examples the interface may be changed by displaying the contents of the file with a border or banner (e.g. a red border or banner).

Figure 5B:
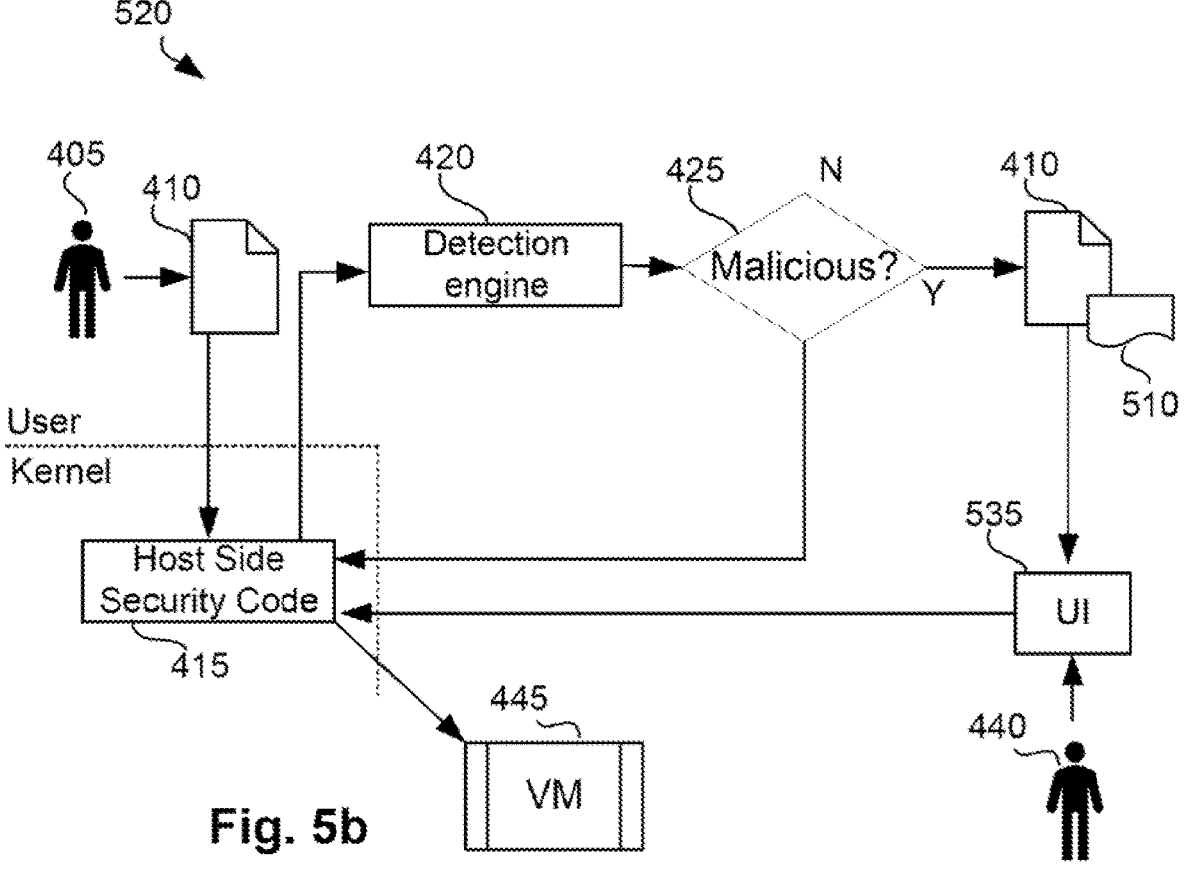

FIG. 5b shows another example of a workflow 520 that may be used instead of, or in conjunction with the workflow 500 of FIG. 5a. The workflow of FIG. 5a is the same as that of FIG. 5b, but the UI 535 may include a filesystem explorer or browser, for example. In this case, the file 410 may be visible to the user in the UI in its original location, if the user attempts to process the file 410 (e.g. by double-clicking the file) the operation may be intercepted by host-side security code 415 (which is shown in FIG. 5b as being the same as the host-side security code 415 that intercepted the file operation placing the file on the computer system, but may be a different host-side security code 415). The host-side security code 415 may check for the presence of metadata indicating that the file has been detected as potentially malicious and, in response, cause the file to be processed in VM 445, rather than by directly processing the file in the host system. That is, the host-side security code 415 (which may be a filter driver, for example) intercepts the attempt to process the potentially malicious file and causes the potentially malicious file to be processed in a VM, as described in relation to FIGS. 1 to 3, for example.

References herein to code may describe any suitable form of computer-readable instructions that may be executed by a processor. For example, the code may be implemented in software, firmware, or a combination of these.

A computer-readable storage medium may be any electronic, magnetic, optical, or other physical storage device that contains or stores executable instructions. Computer-readable storage medium may be, for example, Random Access Memory (RAM), an Electrically Erasable Programmable Read-Only Memory (EEPROM), a storage drive, a Compact Disc Read Only Memory (CD-ROM), and the like. As such, the computer-readable storage medium can be non-transitory. The term "non-transitory" does not encompass transitory propagating signals.

A processor may be, or include, a Central Processing Unit (CPU), Graphics Processing Unit (GPU), Embedded Controller (EC), microprocessor, etc. suitable for retrieval and execution of instructions, electronic circuits configured to perform the operations stored on computer-readable storage media, or a combination thereof. In some examples, the processor may include a plurality of processing elements.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context implies otherwise. In particular, where the indefinite article is used, the specification is to be understood as contemplating plurality as well as singularity, unless the context implies otherwise.

Features, integers or characteristics described in conjunction with a particular aspect or example are to be understood to be applicable to any other aspect or example described herein unless incompatible therewith. All of the features disclosed in this specification (including any accompanying claims, abstract and drawings), and/or all of the operations of any method or process so disclosed, may be combined in any combination, except combinations where at least some of such features and/or operations are mutually exclusive. Examples are not restricted to the details of any foregoing examples. The Examples may extend to any novel one, or any novel combination, of the features disclosed in this specification (including any accompanying claims, abstract and drawings), or to any novel one, or any novel combination, of the operations of any method or process so disclosed.

The reader's attention is directed to all papers and documents which are filed concurrently with or previous to this specification in connection with this application and which are open to public inspection with this specification, and the contents of all such papers and documents are incorporated herein by reference.

Example implementations can also be realized according to the following clauses:

Clause 1: A non-transitory computer-readable storage medium storing thereon instructions that, when executed, cause a processor of a computing device to: encrypt a source file that has been identified as potentially malicious: place the encrypted file in a location accessible to a virtual machine; provide, to the virtual machine, information for decrypting the encrypted file; cause the virtual machine to use the information to process the encrypted file.

Clause 2: The non-transitory computer readable storage medium of clause 1, wherein the instructions, when executed, further cause the processor to: generate access control information of the encrypted file based on access control information of the source file Clause 3. The non-transitory computer readable storage medium of clause 1 or clause 2, wherein the instructions, when executed, further cause the processor to: quarantine the source file in response to an identification that the source file is potentially malicious; allow a request to unquarantine the source file in response to a determination that the request has an administrator privilege; wherein the instructions to place, provide and cause are executed in response to a request independently of whether the request has the administrator privilege.

Clause 4. The non-transitory computer readable storage medium of any one of clauses 1 to 3, wherein the instructions, when executed, further cause the processor to quarantine the source file in place by setting a flag in metadata associated with the source file to indicate that the file is potentially malicious, wherein a filter-driver is to, in response to a determination that the flag is set, block an attempt to process the source file.

Clause 5. The non-transitory computer readable storage medium of clause 4, wherein the instructions, when executed, further cause the processor to quarantine the source file in place in response to a determination that a first quarantine operation has failed, wherein the first quarantine operation is to make an encrypted copy of the source file in a quarantine folder and delete the source file.

Clause 6. A non-transitory computer readable storage medium comprising instructions that when executed cause a processor of a computing device to: initialise a virtual machine; receive, in the virtual machine, an encrypted version of a file; receive, in the virtual machine, decryption information to decrypt the encrypted version of the file; obtain a copy of the the in the virtual machine by using the decryption information to decrypt, in the virtual machine, the encrypted version of the file; and process, in the virtual machine, the copy of the file.

Clause 7. The non-transitory computer readable storage medium of clause 6, wherein the instructions, when executed, further cause the processor to: in response to receiving an indication that the file is detected as potentially malicious, set metadata to indicate that the file is potentially malicious, the metadata to cause a filter driver to block processing of the file.

Clause 8. The non-transitory computer readable storage medium of clause 7, wherein the instructions, when executed, further cause the processor to: in response to a determination that a quarantine operation on the file has failed, set the metadata to indicate that the file is potentially malicious, wherein the quarantine operation to include creation of an encrypted version of the file and deletion of the file.

Clause 9. The non-transitory computer readable storage medium of clause 6, wherein the instructions when executed, cause the processor to quarantine the file, by causing the processor to: create a first encrypted version of the file, and delete the file; and wherein the instructions to cause the encrypted version of the file to be received in the virtual machine by causing the processor to: create a temporary file by copying the first encrypted version of the file, and create a link to the temporary file in a location accessible to the virtual machine.

Clause 10. The non-transitory computer readable storage medium of any one of clauses 6 to 9, wherein the instructions, when executed, further cause the processor to set an access control list of the encrypted version of the file, wherein the access control list based on an access control list of the file.

Clause 11. A non-transitory computer-readable storage medium storing thereon instructions that, when executed cause a processor of a computing device to: obtain an indication that first file is a file that has been determined to be malicious; hinder processing of the first file in response to the indication: initiate a virtual machine; provide the first file to the virtual machine in a state that hinders processing of the first file by a host operating system of the device; allow the virtual machine to process the first file; and process, in the virtual machine, the first file.

Clause 12. The non-transitory computer readable storage medium of clause 11, wherein the instructions, when executed, further cause the processor to: set a metadata flag associated with the first file to indicate that the first file has been determined to be malicious; and in response to an attempt by a process executing on the processor to process the first file, check the metadata flag associated with the first file and, unless an exception has been granted to the process executing on the processor, block processing of the first file by the process executing on the processor when the metadata flag indicates that the first file has been determined to be malicious, and wherein the instructions to cause the processor to allow the virtual machine to process the first file include instructions to cause the processor to grant the exception to a process associated with the virtual machine.

Clause 13. The non-transitory computer readable storage medium of clause 12, wherein the instructions to cause the processor to provide the first file to the virtual machine cause the processor to generate an encrypted copy of the first file in a location accessible to the virtual machine.

Clause 14. The non-transitory computer readable storage medium of any one of clauses 11, wherein the instructions to hinder processing of the first file include instructions to create a quarantine file and delete the first file, wherein the quarantine file is an encrypted copy of the first file, and wherein the instructions to cause the processor to provide the first file to the virtual machine cause the processor to place a copy of the quarantine file in a location accessible by the virtual machine, and the instructions to cause the processor to allow the virtual machine to process the first file cause the processor to provide the virtual machine with information usable to decrypt the quarantine file.

Clause 15. The non-transitory computer readable storage medium of any one of clauses 11 to 14, wherein the instructions, when executed, are further to cause the processor to: determine whether an attempt to process the first file is initiated by input via a keyboard, mouse or touchscreen and, in response to a determination that the attempt to process the first file is initiated by input via a keyboard, mouse or touchscreen, cause the processor to carry out the provide, allow and process operations.

The invention claimed is:

1. A non-transitory computer-readable storage medium storing thereon instructions that, when executed, cause a processor of a computing device to:
   determine, via a detection engine, that a source file is potentially malicious;

quarantine the source file in response to determining that the source file is potentially malicious, wherein, to quarantine the source file, the instructions cause the processor to:
      encrypt the source file that has been identified as potentially malicious; and
      place the encrypted file in a location accessible to a virtual machine;
   provide, to the virtual machine, information for decrypting the encrypted file; and
   cause the virtual machine to use the information to process the encrypted file.

2. The non-transitory computer readable storage medium of claim 1, wherein the instructions, when executed, further cause the processor to:
   generate access control information of the encrypted file based on access control information of the source file.

3. The non-transitory computer readable storage medium of claim 1, wherein the instructions, when executed, further cause the processor to:
   allow a request to unquarantine the source file in response to a determination that the request has an administrator privilege; wherein
   the instructions to place, provide and cause are executed in response to a request independently of whether the request has the administrator privilege.

4. The non-transitory computer readable storage medium of claim 1, wherein the instructions, when executed, further cause the processor to quarantine the source file in place by setting a flag in metadata associated with the source file to indicate that the file is potentially malicious,
   wherein a filter-driver is to, in response to a determination that the flag is set, block an attempt to process the source file.

5. The non-transitory computer readable storage medium of claim 4, wherein the instructions, when executed, further cause the processor to quarantine the source file in place in response to a determination that a first quarantine operation has failed, wherein the first quarantine operation is to make an encrypted copy of the source file in a quarantine folder and delete the source file.

6. A non-transitory computer readable storage medium comprising instructions that when executed cause a processor of a computing device to:
   initialize a virtual machine;
   receive, in the virtual machine, an encrypted version of a file, wherein the file was determined to be malicious by a detection engine;
   receive, in the virtual machine, decryption information to decrypt the encrypted version of the file;
   obtain a copy of the file in the virtual machine by using the decryption information to decrypt, in the virtual machine, the encrypted version of the file; and
   process, in the virtual machine, the copy of the file.

7. The non-transitory computer readable storage medium of claim 6, wherein the instructions, when executed, further cause the processor to:
   in response to receiving an indication that the file is detected as potentially malicious, set metadata to indicate that the file is potentially malicious, the metadata to cause a filter driver to block processing of the file.

8. The non-transitory computer readable storage medium of claim 7, wherein the instructions, when executed, further cause the processor to:
   in response to a determination that a quarantine operation on the file has failed, set the metadata to indicate that the file is potentially malicious, wherein the quarantine operation to include creation of an encrypted version of the file and deletion of the file.

9. The non-transitory computer readable storage medium of claim 6, wherein the instructions when executed, cause the processor to quarantine the file, by causing the processor to:

create a first encrypted version of the file, and delete the file; and wherein the instructions to cause the encrypted version of the file to be received in the virtual machine by causing the processor to:

create a temporary file by copying the first encrypted version of the file, and create a link to the temporary file in a location accessible to the virtual machine.

10. The non-transitory computer readable storage medium of claim 6, wherein the instructions, when executed, further cause the processor to set an access control list of the encrypted version of the file, wherein the access control list based on an access control list of the file.

11. A non-transitory computer-readable storage medium storing thereon instructions that, when executed cause a processor of a computing device to:

obtain an indication, from a detection engine, that a first file is a file that has been determined to be malicious;

hinder processing of the first file in response to the indication;

initiate a virtual machine;

provide the first file to the virtual machine in a state that hinders processing of the first file by a host operating system of the device;

allow the virtual machine to process the first file; and process, in the virtual machine, the first file.

12. The non-transitory computer readable storage medium of claim 11, wherein the instructions, when executed, further cause the processor to:

set a metadata flag associated with the first file to indicate that the first file has been determined to be malicious; and in response to an attempt by a process executing on the processor to process the first file, check the metadata flag associated with the first file and, unless an exception has been granted to the process executing on the processor, block processing of the first file by the process executing on the processor when the metadata flag indicates that the first file has been determined to be malicious, and wherein the instructions to cause the processor to allow the virtual machine to process the first file include instructions to cause the processor to grant the exception to a process associated with the virtual machine.

13. The non-transitory computer readable storage medium of claim 12, wherein the instructions to cause the processor to provide the first file to the virtual machine cause the processor to generate an encrypted copy of the first file in a location accessible to the virtual machine.

14. The non-transitory computer readable storage medium of claim 11, wherein the instructions to hinder processing of the first file include instructions to create a quarantine file and delete the first file, wherein the quarantine file is an encrypted copy of the first file, and wherein the instructions to cause the processor to provide the first file to the virtual machine cause the processor to place a copy of the quarantine file in a location accessible by the virtual machine, and the instructions to cause the processor to allow the virtual machine to process the first file cause the processor to provide the virtual machine with information usable to decrypt the quarantine file.

15. The non-transitory computer readable storage medium of claim 11, wherein the instructions, when executed, are further to cause the processor to:

determine whether an attempt to process the first file is initiated by input via a keyboard, mouse or touchscreen and, in response to a determination that the attempt to process the first file is initiated by input via a keyboard, mouse or touchscreen, cause the processor to carry out the provide, allow and process operations.

16. The non-transitory computer-readable storage medium of claim 1, wherein the detection engine comprises anti-malware or antivirus code.

17. The non-transitory computer-readable storage medium of claim 6, wherein, to process, in the virtual machine, the copy of the file comprises opening, viewing, and executing the copy of the file in the virtual machine.

18. The non-transitory computer-readable storage medium of 17, wherein the instructions, when executed, cause the processor to:

provide a user interface for the computing device;

allow a user to interact with the copy of the file via the user interface.

* * * * *